United States Patent
Cheng et al.

(10) Patent No.: US 6,528,643 B1
(45) Date of Patent: Mar. 4, 2003

(54) ESTERIFIED POLYSACCHARIDE PRODUCTS AND B-LACTONE RING OPENED KETENE DIMER PRODUCTS CONTAINING THE COMPOSITIONS, AND PROCESS OF MAKING THE SAME

(75) Inventors: Huai N. Cheng, Wilmington, DE (US); Qu Ming Gu, Hockessin, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/564,575

(22) Filed: May 5, 2000

(51) Int. Cl.⁷ .............. C07H 1/00; C07H 5/04; C07H 5/06; C07H 11/00
(52) U.S. Cl. .............. 536/123.1; 536/18.7; 536/55.3; 536/115; 536/123.1
(58) Field of Search .............. 536/18.7, 55.3, 536/115, 123.1

(56) References Cited

U.S. PATENT DOCUMENTS

| | | | |
|---|---|---|---|
| 2,627,477 A | 2/1953 | Downey | 106/170 |
| 3,931,069 A | 1/1976 | Lundin | 260/17 R |
| 4,614,718 A | 9/1986 | Seino et al. | 435/72 |
| 5,494,602 A | 2/1996 | Thomaides et al. | 252/174.17 |
| 5,508,182 A | * 4/1996 | Schneider et al. | 435/135 |
| 5,627,273 A | 5/1997 | Thomaides et al. | 536/18.7 |

FOREIGN PATENT DOCUMENTS

| | | |
|---|---|---|
| DE | 43 29 293 A | 3/1995 |
| EP | 0219426 | 4/1987 |
| JP | 61268784 | 11/1986 |
| JP | 1-168282 | 7/1989 |
| WO | 93 03063 A | 2/1993 |
| WO | 99 61478 A | 12/1999 |
| WO | 99/61479 | 12/1999 |

OTHER PUBLICATIONS

English Language Abstract of JP 61–268784.
English Language Abstract of JP 1–168282.
Analysis of Phthalic Acid Esters of Cellulose and of Polyvinyl Alcohol, by C.J. Malm, et al (Analytical Chemistry, 25(2) p245–249). 1953.
Preparation of Phthalic Acid Esters of Cellulose, by C.J. Malm, et al (Cellulose Derivatives, 49(1) p84–88). 1957.
Cellulose Acetate Succinate as an Enteric Coating for Some Compressed Tablet, by L.O. Wilken, Jr., et al (Journal of Pharmaceutical Sciences, 51(5) p484–490). 1962.
AKD sizing mechanism: a more definitive description, by K.J. Bottorff (Tappi Journal, 77(4) p105–116). 1994.
New insights into the AKD sizing mechanism, by K.J. Bottorff, et al (Nordic Pulp and Paper Research Journal No. 1/1993, p 86–95).

(List continued on next page.)

*Primary Examiner*—Jezia Riley
(74) *Attorney, Agent, or Firm*—Joanne Rossi; Robert O'Flynn O'Brien

(57) ABSTRACT

Product of esterified polysaccharides and the process of making such product. The process can be enzymatic where an enzyme is used as a catalyst for the reaction. The process can also be chemical where no enzyme is used. Novel products are obtained through lipase-catalyzed β-lactone ring opening alcoholysis of ketene dimers and the process of making such compositions containing products.

25 Claims, 1 Drawing Sheet

Brookfield viscosity as a function of AKD/HEC ratio

OTHER PUBLICATIONS

Regioselective Acylation of Secondary Hydroxyl Groups in Sugars Catalyzed by Lipases in Organic Solvents, by M. Therisod, et al (J. Am. Chem. Soc., 1987, 109, p3977–3981).

Polyethlene Glycol–Modified Lipase Caralyzes Asymmetric Alcoholysis of Decalactone in n–Decanol, by T. Uemura, et al (Biotechnology Letters, 17(1) p61–66). 1995.

Alcoholysis of Decalactone with Polythylene Glycol–Modified Lipase in 1,1,1–Trichloroethane, by M. Furukawa, et al (Biochemical and Biophysical Research Communications, 199(1) p41–45). 1994.

Direct Evidence for Covalent Bonding Ketene Dimer Sizing Agents and Cellulose, by S.H. Nahm (Journal of Wood Chemistry and Technology, 6(1) p89–112). 1986.

Enzymes in Organic Synthesis VII: Enzymatic Acylation of Amines, by Z. Djeghaba, et al (Tetrahedron Letters 32(6) p761–762). 1991.

* cited by examiner

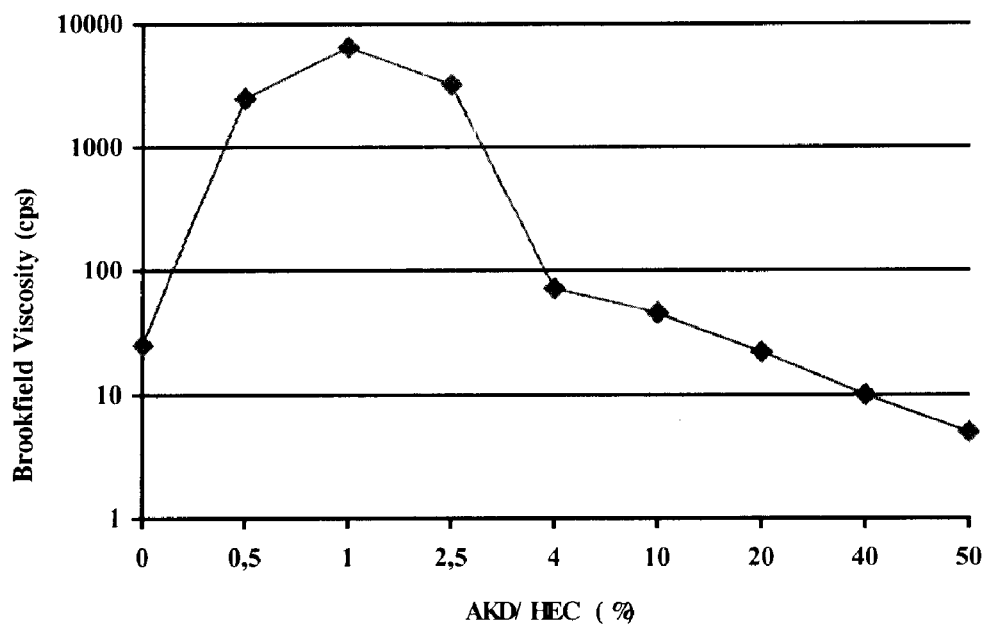
Brookfield viscosity as a function of AKD/HEC ratio

ESTERIFIED POLYSACCHARIDE PRODUCTS AND B-LACTONE RING OPENED KETENE DIMER PRODUCTS CONTAINING THE COMPOSITIONS, AND PROCESS OF MAKING THE SAME

BACKGROUND OF THE INVENTION

1. Field of the Invention

The present invention relates to the esterification of polysaccharides with a ketene dimer using enzymatic and chemical methods. This invention also relates to novel compositions obtained through lipase-catalyzed β-lactone ring opening alcoholysis of ketene dimers, and to products containing the compositions.

2. Description of Background and Related Art

Esters of polysaccharides such as cellulose ethers are usually prepared by converting polysaccharides to the monoesters by various chemical synthetic methods using carboxyl anhydrides. (C. J. Malta, *Anal. Chem.*, 25(2), 245–249, 1953; C. J. Malta, *Industrial and Engineering Chemistry* 49(1),84–88, 1957). Different types of mixed monocarboxyl esters of cellulose and cellulose ethers have been chemically synthesized, such as cellulose acetate succinate (*J of Pharm. Sci.* 51, 484, 1962) and hydroxypropyl cellulose acetate succinate (EP 0219426, Jun. 10, 1986).

The effect of alkyl ketene dimer (AKD) in sizing paper is disclosed in S. H. Nahm, *J. Wood Chem. Technol.*, 6(1), 89–112, 1986; K. J. Bottorff, *Tappi J.* 77(4), 105–116, 1994, and *Nord. Pulp Pap. Res. J.* 8(1), 86–95,1993. However, ketene dimers have not been used in an enzymatic process to form esters of polysaccharides or polysaccharide derivatives. AKD has also not been used to chemically react with polysaccharide in order to intentionally make such esterified polysaccharide products.

AKDs have an activated lactone functionality that reacts with hydroxyl and amine groups under mild conditions, which avoids the requirement of using an acyl chloride or anhydride. AKD starting materials are cheap and there are few or no by-products after the reaction.

Therefore, it would be advantageous to use ketene dimers as one of the starting materials to make esterified polysaccharides.

SUMMARY OF THE INVENTION

The present invention provides a product comprising a novel esterified polysaccharide manufactured using an enzyme as a catalyst under mild reaction conditions with relatively high yields. Specifically, the present invention provides for an esterified polysaccharide product having the general formula:

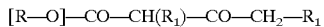

[R—O]—CO—CH(R$_1$)—CO—CH$_2$—R$_1$ wherein R is a polysaccharide, and R$_1$ is a linear or a branched aliphatic or olefinic chain having 2 to 20 carbons; in combination with an enzyme of a type that catalyzes the formation of the esterified polysaccharide. This esterified polysaccharide is a reaction product between a polysaccharide and a ketene dimer. The enzyme maybe in deactivated form by the end of the reaction.

The product has about 80 to 100 wt. % of esterified polysaccharide, based on the total weight of the product and the esterified polysaccharide product contains about 0.10 to 10 wt % of the reacted ketene dimer based on the total weight of the esterified polysaccharide product. The enzyme is obtained from animal, plant, bacteria, virus, yeast, fungi, or mixtures thereof. The enzyme used is preferably a hydrolase. It can preferably be a lipase or a protease. The lipase maybe obtained from a source selected from a group consisting of Pseudomonas sp., or *Pseudomonas fluorescens, Candida antarctica, Candida rugosa, Candida cylindracea, Porcine pancreas, Rhizopus delemar,* and *Rhizopus Niveus.* Preferably, the lipase is obtained from Pseudomonas sp. or from *Pseudomonas fluorescens*.

The polysaccharide used is at least one selected from the group consisting of cellulose ethers, hydroxyethylcellulose, hydroxypropylcellulose, carboxymethylcellulose, guar, cationic guar, and hydroxypropylguar. Preferably, it is hydroxyethylcellulose with a molar substitution of about 2.0 to 4.0. More preferably, the molar substitution is about 2.5.

The ketene dimer used is at least one of (A) alkyl ketene dimer (B) alkenyl ketene dimer, and (C) ketene dimer of mixed fatty acids; and the ketene dimer can be grafted onto the polysaccharide during the reaction. The alkyl ketene dimer is one selected from linear or branched aliphatic chains having 8 to 44 total carbons. The alkenyl ketene dimer is preferably one selected from linear or branched alkenyl chains having 8 to 44 total carbons with 0 to 6 total double bonds. The fatty acid of the fatty acid ketene dimer is aliphatic or olefinic with 4 to 22 carbons. Preferably, the ketene dimer is at least one selected from the group consisting of stearyl, palmityl, oleyl, linoleyl groups and mixtures thereof.

The product of this invention can be water-soluble or water-insoluble. It has a viscosity of about 1 to 300 times higher than that of the polysaccharide before the reaction. Preferably, it has a viscosity of about 20 to 300 times higher than that of the polysaccharide before the reaction. Such higher viscosity remains substantially unchanged after three days at pH of about 6.5 to 8.5. The molecular weight of the product is about 1,000 to 3,000,000.

More specifically, the present invention provides an esterified polysaccharide that is an enzymatic reaction product between a polysaccharide or a polysaccharide ether and a ketene dimer. The polysaccharide ether has a molar substitution of about 0 to 4.0. The ketene dimer is an aliphatyl or olefinyl ketene dimer. The enzyme, which may be a lipase obtained from Pseudomonas sp. or from *Pseudomonas fluorescens,* is preferably in deactivated form by the end of the reaction. This product preferably has a viscosity about 20 to 300 times more than that of polysaccharide before reaction.

The present invention also provides a process of making an esterified polysaccharide that includes a step of adding an effective amount of enzyme to a polysaccharide reaction mixture. The reaction mixture comprises organic solvents, polysaccharides, and a ketene dimer. The organic solvent medium is at least one selected from the group consisting of hydrocarbons, polar aprotic solvents, and non-polar solvents. The organic solvent medium is preferably a non-polar solvent selected from the group consisting of ketones, ethers, and cyclic ethers. Most preferably, the organic solvent medium is a polar aprotic compound. The polar aprotic compound is at least one selected from the group consisting of N,N-dimethylacetamide, N,N-dimethylformamide, and dimethylsulfoxide. The organic solvent medium is present in an amount of about 10 to 95 wt. % based on the total weight of the reaction mixture. The polysaccharide in this process is present in an amount of about 1 to 75 wt. % based on the total weight of the reaction mixture. The ketene dimer is present in an amount of about 0.10 to 10 wt. % based on the total weight of the reaction mixture. The reaction mixture temperature is maintained at between about 20° C. to 100° C. during reaction, preferably between about 40° C to 60° C. The reaction time is between about 1 to 72 hours, preferably, between about 6 to 24 hours. The process further comprises deactivating the enzyme by the end of the reaction. The process further comprises washing the reaction product with isopropyl alcohol. The process further comprises drying the washed reaction product.

In specific preferred embodiments, the process includes: adding enzyme in the amount of about 0.013 to 13 wt. % based on the weight of polysaccharide to a reaction mixture; wherein the reaction mixture comprises (A) cellulose ether or guar ether; (B) an alkyl or alkenyl ketene dimer; and (C) an organic solvent selected from the group consisting of N,N-dimethylacetamine, N,N-dimethylformamide, and dimethylsulfoxide; heating the reaction mixture for about 6 to 24 hours at about 40° C. to 60° C.; deactivating enzyme after the completion of the reaction; washing the reaction product with an alcohol such as isopropyl alcohol; and drying the reaction product.

This invention also provides a chemically modified polysaccharide product having the general formula:

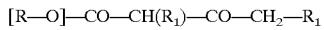

wherein R is a polysaccharide, and $R_1$ is a linear or a branched aliphatic or olefinic chain having 2 to 20 carbons. This chemically modified polysaccharide is also an esterified polysaccharide product.

Specifically, in other preferred embodiments, this invention also provides an esterified polysaccharide product that is a chemical reaction product between a polysaccharide and a ketene dimer. The polysaccharide ether has a molar substitution of about 0 to 4.0. The ketene dimer is an aliphatyl or olefinyl ketene dimer. The esterified polysaccharide has about 80 to 100 wt. % of polysaccharide based on the total weight of esterified polysaccharide. This product preferably has a viscosity about 2 to 1000 times more than that of the polysaccharide before the reaction.

This invention also provides a process of chemically making a modified polysaccharide by reacting polysaccharide with ketene dimer in a reaction mixture. The weight ratio between ketene dimmer to polysaccharide is about 0.0013 to 0.13.

Specifically, in other preferred embodiments, this invention also provides a process of chemically making an esterified polysaccharide product by: heating the reaction mixture for about 4 to 72 hours at a temperature of about 40 to 120° C.; wherein the reaction mixture comprises:(A) a hydroxyethyl cellulose; (B) an aliphatyl or olefinyl ketene dimer; and (C) an organic solvent being one of N,N-dimethylacetamine, N,N-dimethylformamide, and dimethylsulfoxide; washing the reaction product with an alcohol such as isopropyl alcohol; and drying the reaction product.

The esterified polysaccharides have many applications. They may be used in paints as thickeners and stabilizers, in construction materials to impart shear or tensile strength, or for personal care applications as polymeric emulsifiers. They may also be used for encapsulation, as excipients for pharmaceutical tablets, and as antihalation coatings. They may also be used as ingredients in detergents.

The present invention also provides a product that comprises a composition of modified ketene dimer having the general formula:

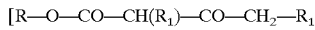

wherein R is a hydroxyl-containing compound, and $R_1$ is a linear or a branched aliphatic or olefinic chain having 2 to 20 carbons; in combination with an enzyme which can catalyze the formation of the modified ketene dimer.

Specifically, the composition comprises β-lactone ring-opened and alcoholized ketene dimer which is an enzymatic reaction product between a hydroxyl-containing compound and a ketene dimer, in the presence of about 0.13 to 13 wt. % enzyme based on the weight of said hydroxyl-containing compound. The hydroxyl-containing compound is at least one of (A) a polyethylene glycol, (B) ethanol, (C) methanol, and (D) sucrose. The ketene dimer is an aliphatyl or olefinyl ketene dimer. The enzyme is a lipase obtained from Pseudomonas sp. or from *Pseudomonas fluorescens*.

This invention also provides a process of making a modified ketene dimer by adding an effective amount of enzyme to a ketene dimer reaction mixture.

Specifically, this invention also provides a process of making a β-lactone ring-opened and alcoholized ketene dimer by: adding enzyme in the amount of about 0.1 to 100 wt. % based on the weight of ketene dimer to a reaction mixture; wherein the reaction mixture comprises (A) one of polyethylene glycol, ethanol, methanol, and sucrose; (B) an alkyl or alkenyl ketene dimer; and (C) an organic solvent of t-butyl methyl ether; heating the reaction mixture for about 24 to 72 hours at about 50° C.; deactivating enzyme after the completion of the reaction; and washing the reaction product with hexane.

BRIEF DESCRIPTION OF THE FIGURE

The FIGURE shows Brookfield viscosity as a function of AKD/HEC ratio.

DETAILED DESCRIPTION OF THE INVENTION

As used herein:

"Molecular weight" is measured by size exclusion chromatographic (SEC) analysis and the units are Daltons. SEC analysis is performed on size exclusion columns (Eichrom CATSEC 4000, 1000, 300, 100 in series, 5–10 micrometer particle size) using Waters 515 series chromatographic equipment with a mixture of aqueous solution (1% sodium nitrate, 0.1% trifluoroacetic acid) and acetonitrile (50:50, v/v) as the mobile phase. The detector is a Hewlett Packard 1047A differential refractometer. The molecular weight average is calculated using a Waters Millennium-32 data processing software from calibration against commercial standard poly (2-vinyl pyridine). Estimates of the number average and weight average molecular weight Mn and Mw of the product mixtures are computer-generated using the same system.

The "viscosity" is measured using a DV-I Viscometer (Brookfield Viscosity Lab, Middleboro, Mass.). A selected spindle (number 2) is attached to the instrument, which is set for a speed of 30 RPM. A polyamide resin solution is prepared at 12.5%. The Brookfield viscosity spindle is carefully inserted to the solution so as not to trap any air bubbles and then rotated at the above-mentioned speed for 3 minutes at 24° C. The units are centipoises.

The term "molar substitution" means the average molar number of one compound that has been grafted onto a monomer residue of a polymer.

The thin-layer chromatography (TLC) is performed on $SiO_2$ TLC plate. One to two micro liters of the sample are spotted on the TLC plate. The plate is then eluted by ethyl acetate/hexane (1:9). The TLC plate is exposed to $I_2$ vapor or soaked into 15% $H_2SO_4$ solution. The sample is detected by its different color with the background and the $R_f$ value is recorded.

The term "flash chromatography" means fast chromatography and is performed under a low air or nitrogen pressure.

The term "Rf" refers to the position of a specific compound on TLC plat after solvent elution. It varies from 0 to 1.0 where 0 means no movement with solvent elution and 1.0 means maximum movement.

1. Enzymatic Synthesis of Esterified Polysaccharides

Esterified polysaccharides of this invention can be represented by the general structure as shown below:

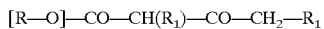

[R—O]—CO—CH($R_1$)—CO—CH$_2$—$R_1$ wherein R is a polysaccharide, and the rest of the structure originates from ring opening of a ketene dimer. The group $R_1$ represents a linear or a branched aliphatic or olefinic chain having 2–20 carbons. The esterification of polysaccharides by a ketene dimer causes the polysaccharides to become more hydrophobic.

In a typical synthesis of esterified polysaccharides, the polysaccharide, which constitutes about 1 to 75 wt. % of the reaction mixture, is suspended in an organic solvent and a ketene dimer. The preferred amount of the polysaccharide is about 5 to 60%. The most preferred polysaccharide amount is about 10%. The ketene dimer is present in an amount of about 0.1 to 10 wt. % of the reaction mixture. The preferred ketene dimer amount is about 0.1 to 2 wt. %. The most preferred ketene dimer amount is about 0.2 wt. %. An enzyme is added to the reaction mixture just before the start of the reaction. The amount of enzyme used is about 0.010 to 10 wt. % of the reaction mixture. The preferred enzyme amount is about 0.10 to 5 wt. %. The most preferred enzyme amount is about 0.5 wt. %. The enzyme opens the β-lactone ring of the ketene dimer and forms a covalent intermediate ("acyl-enzyme intermediate"), which further reacts with the hydroxyl groups of polysaccharides to form the ester bond. Thus, ketene dimers are grafted onto the polysaccharide.

The temperature of the reaction is optimally between about 20 to 100° C., preferably between about 40 to 60° C. The reaction time is about 1 to 72 hours. The preferable time is about 6 to 24 hours. It is found, at the end of the reaction, that the product contains about 80 to 100 wt. % of esterified polysaccharides and 0.10 to 10 wt. % of the reacted ketene dimer.

At the end of the reaction, enzymes are deactivated using heat. The product is washed with an organic solvent, such as isopropyl alcohol or other similar solvents and then dried in air.

Solubility of the product in water varies when different types of starting materials are used. Some products are water-soluble and some are not. It is found that the viscosity of an aqueous solution of the product is much higher than that of the starting material polysaccharide at the same concentration. Some products are about 300 times higher in viscosity. Most products are about 20–300 times higher than the viscosities of the starting material polysaccharides. The higher viscosity of the product remains substantially unchanged for at least three days when the product is stored at pH of about 6.5 to 8.5.

The esterified polysaccharide products thus synthesized have a molecular weight of about 1,000 to 3,000,000.

Many different polysaccharides can be used in this invention. These include cellulose ether, hydroxyethylcellulose (HEC), hydroxypropylcellulose (HPC), carboxymethylcellulose, and guar derivatives such as cationic guar and hydroxypropylguar. The preferred polysaccharides include cellulose ether, HEC, and HPC. The most preferred polysaccharide is HEC. The HEC usually has a molar substitution of about 2.0 to 4.0. The preferred molar substitution of HEC is about 2.5.

Many different ketene dimers can be used in this reaction. These include alkyl ketene dimers (AKD) such as Aquapel® from Hercules, alkenyl ketene dimer such as Precis® from Hercules, and various ketene dimers of mixed fatty acids. The preferred ketene dimers are aliphatyl or olefinyl ketene dimer with 8 to 44 carbons and 0 to 6 double bonds. More preferred ketene dimers are those wherein the alkyl or alkenyl groups are selected from stearyl, palmityl, oleyl, linoleyl groups and mixtures thereof. Some of the fatty acid ketene dimers are known materials, which are prepared by the 2+2 addition reaction of the alkyl ketenes. An exemplary reaction scheme is shown below:

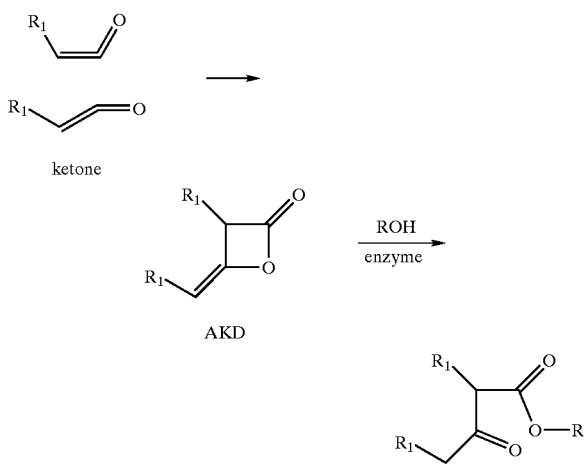

The β-lactone ring of the ketene dimer reacts with the hydroxyl functionality in the polysaccharide (e.g. ROH above) under certain reaction conditions to form an alkyl β-ketone-ester of the polysaccharide, an esterified polysaccharide, through a ring-opening reaction.

Suitable organic solvents include hydrocarbons, polar aprotic solvents, and non-polar solvents, including ketones, ethers, and cyclic ethers. The preferable solvents are polar aprotic compounds. The most preferable solvents are N, N-dimethylacetamide, N, N-dimethylformamide, and dimethylsulfoxide. The organic solvents are present in an amount of about 10 to 95 wt. % of the total reaction mixture.

The process uses an enzyme, preferably lipase, under mild conditions in organic solvents. The enzyme is used as a catalyst for the synthesis of polysaccharide and ketene dimers. The enzyme used is a hydrolase. More preferably it is a lipase or protease. Such enzymes can be obtained from animal, plant, bacteria, virus, yeast, fungi, or mixtures thereof. Preferably the enzyme is a lipase obtained from Pseudomonas sp., or *Pseudomonas fluorescens, Candida antarctica, Candida rugosa, Candida cylindracea, Porcine pancreas, Rhizopus delemar, Rhizopus Niveus* or mixtures thereof. Most preferably, the enzyme is a lipase obtained from Pseudomonas sp. or from *Pseudomonas fluorescens*. Similar enzyme from a synthetic source may also be used.

Without further elaboration, it is believed that one skilled in the art can, using the preceding description, utilize the present invention to its fullest extent.

The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight, unless otherwise indicated.

EXAMPLE 1

An HEC sample (Natrosol®HX, Hercules, 5 g, 0.25 mol) having a molar substitution of 2.5 is suspended in 100 ml of N,N-dimethylacetamide (DMAc). 0.8 g of AKD (Aquapel® 36H, Hercules) is added, followed by 0.4 g of lipase from Pseudomonas sp. (from Amano). The reaction mixture is incubated at 50° C. for 24 hours and then treated with isopropyl alcohol (IPA). The resulting precipitate is washed with IPA and dried. The yield is about 5.1 g. The product is not water-soluble. IR analysis shows the absorption at 1715 and 1740 cm$^{-1}$, corresponding to the ketone and ester functional group, respectively. $^{13}$C-NMR shows a peak at 14.0 ppm, corresponding to —CH$_3$ and peaks at 23 and 30 ppm corresponding to the CH$_2$ of the long chain fatty acid. The combined data of IR and NMR indicate that the AKD addition onto HEC is accomplished.

EXAMPLE 2

An HEC sample (HEC 250GR, Hercules, 10 g, 0.5 mol) having a molar substitution of 2.5 is suspended in 200 ml of N,N-dimethylformamide (DMF). 2 g of AKD (Aquapel® 36H, Hercules) are added followed by 1 g of lipase from Pseudomonas sp. (Amano). The reaction mixture is incubated at 50° C. for 48 hours. The mixture is then treated with IPA, and the resulting precipitate is washed with IPA and dried. The product is a water-insoluble material and the yield is about 9.8 g.

EXAMPLE 3

An HEC sample (HEC 250GR, Hercules, 10 g, 0.5 mol) having a molar substitution of 2.5 is suspended in 200 ml of DMF. 2 g of alkenyl ketene dimer (Precis®, Hercules) are added followed by 1 g of lipase from Pseudomonas sp. (Amano). The reaction mixture is incubated at 50° C. for 24 hours and treated with IPA. The resulting precipitate is washed with IPA and dried. The product is partially soluble in water. The yield is about 10.3 g. IR analysis shows the absorption at 1715 and 1740 cm$^{-1}$ corresponding to the ketone and ester functional group, respectively. $^{13}$C-NMR shows peaks at 14, 23 and 30 ppm, corresponding to the fatty acid groups, and around 142 ppm which corresponded to the —CH=CH— carbons of fatty acid on Precise. The IR and NMR results indicate that the addition of AKD onto HEC is achieved.

EXAMPLE 4

An HEC sample (HEC-250G, Hercules, 10 g, 0.5 mol) having a molar substitution of 2.5 is suspended in 200 ml of DMF, and 0.2 g of alkyl ketene dimer (Aquapel® 36H, Hercules) is added followed by 0.5 g of lipase from Pseudomonas sp. (Amano). The reaction mixture is incubated at 50° C. for 24 hours and added to IPA. The product that precipitates out is washed with IPA and dried. This product is a water-soluble material and the yield is about 10.0 g. IR absorption at 1715 and 1740 cm$^{-1}$ is not detectable. However, the Brookfield viscosity measurement shows about 120 times increase in viscosity as compared to the viscosity of the untreated HEC, indicating the presence of covalent grafting of AKD onto HEC. As a control experiment, simply mixing HEC and AKD using the same ratio (with no enzyme) does not show any viscosity increase.

The products according to this invention have interesting and useful properties. The Brookfield viscosities of the esterified polysaccharide are increased more than about 100 times when the fatty acid of the fatty acid ketene dimer has more than 16 carbons. (See FIG. 1 for HEC esterified with Precis®) It is also found that as the reaction conditions become more severe (such as higher temperatures and higher AKD/polysaccharides ratios), alkyl ketene dimer can be forced to graft onto some of polysaccharides to produce polysaccharide esters with less (or even no) enzyme.

The properties of these esterified polysaccharides can be changed by choosing different types of ester groups and/or varying the molar substitution of these substituents. Although the reaction is optimized for alkyl ketene dimers and alkenyl ketene dimers, it works equally well for fatty acid ketene dimers in general. The fatty acids can be stearic, palmitic, oleic, linoleic, or mixtures thereof.

EXAMPLE 5

The viscosities of the aqueous solution the AKD-modified HEC esters are measured at 1% concentration at pH 6.5 and room temperature. ALV type Brookfield viscometer is used for the measurement with the spindle speed at 30 rpm.

Precis from Hercules is used as AKD in this experiment. The viscosity of HEC/Precis esters depends on the weight ratio of HEC to Precis used in the reaction. As shown in FIG. 1, the viscosity of the HEC/Precis ester increases significantly (100–300 time) when the weight ratio is between 50–100.

EXAMPLE 6

Several AKD (Precis®)-modified HEC esters are synthesized based on the method described in Example 4. In all cases (see Table 1 below), the viscosities of the Precis/HEC are significantly improve as compared to the starting HEC. It is found that the viscosities remain substantially unchanged after 3 days at pH of about 6.5 to pH 8.5.

TABLE I

HEC/AKD Esters and their Viscosities

| | HEC types | Molecular weight | SM Viscosity (%) | Product Viscosity (%) |
|---|---|---|---|---|
| Example 6.1 | 250 LR | 90,000 | <5 (2%) | 30 (2%) |
| Example 6.2 | 250 GR | 300,000 | 20 (1%) | 5,600 (1%) |
| Example 6.3 | 250 MR | 720,000 | 340 (1%) | 14,500 (1%) |
| Example 6.4 | 250 HR | 1,100,000 | 1,050 (1%) | 17,500 (1%) |

SM - starting material; LR, GR, MR, HR are brand names of HEC.

EXAMPLE 7

A cationic guar sample (N-Hance 3000, Hercules, 10 g) is suspended in 100 ml of t-butyl methyl ether. 2 g of alkyl ketene dimer (Aquapel®36H, Hercules) is added, followed by 0.4 g of Novozym 435 (lipase from *Candida antarctica*. Novo Nordisk). The mixture is stirred at 50° C. for 24 hours. The product is recovered by filtration and washed with IPA and hexane. After air-drying, the yield is about 10.5 g. The product is water-soluble. IR analysis shows the absorption at 1680 and 1735 cm$^{-1}$, corresponding to the ketone and ester functional group, respectively. A control experiment is performed in the absence of the enzyme. The product does not show detectable absorbance at 1735–1750 cm$^{-1}$, indicating that ketone and ester formation is low or negligible.

From the foregoing description, one skilled in the art can easily ascertain the essential characteristics of this invention, and without departing from the spirit and scope thereof, can make various changes and modifications of the invention to adapt it to various usages and conditions.

2. Chemical Synthesis of Esterified Polysaccharides

The disclosed esterified polysaccharides can also be made chemically without the presence of an enzyme as a catalyst. However, the efficiency of such process is not as good as the enzyme-catalyzed reaction. Compared to the enzymatic method, the same starting material selections and processes apply to this chemical method with the differences highlighted below.

In the reaction mixture, the weight ratio at the start of the reaction between ketene dimer and polysaccharide is about 0.0013 to 0.13. At the end of the reaction, the product usually contains more than about 5 wt. % of esterified polysaccharide. This chemically made product usually has a viscosity about 2 to 1000 times more than that of polysaccharide before the esterification. The reaction is usually performed by heating the reaction mixture at a temperature of about 40 to 120° C. for about 4 to 72 hours.

Without further elaboration, it is believed that one skilled in the art can, using the preceding description, utilize the present invention to its fullest extent.

The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 8

A hydroxylethyl cellulose (HEC 250MR, Hercules, 10 g, 0.5 mol) having a molar substitution of 2.5 is suspended in 200 ml of DMF. 2 g of alkenyl ketene dimer (Precis®, Hercules) is added. The mixture is incubated at 50° C. for 24 hours, and then treated with isopropyl alcohol (IPA) to precipitate the modified HEC. The precipitates are washed with IPA and dried. The product is a water-soluble material with a five-fold increase in Brookfield viscosity at 1% concentration as compared to the unmodified HEC. The yield is about 9.8 g. IR analysis shows signals at 1715 and 1740 cm$^1$. $^{13}$C-NMR also shows signals at 14, 23, 30 and 130 ppm, indicating that, in the absence of an enzyme, the addition of AKD onto HEC is also successful, but with less efficiency.

EXAMPLE 9

A hydroxylethyl cellulose (HEC 250G, Hercules, 10 g, 0.5 mol) having a molar substitution of 2.5 is dissolved in 200 ml of DMF. 1 g of alkyl ketene dimer (Hercules) is added. The reaction mixture is incubated at 50° C. for 24 hours, and then treated with isopropyl alcohol (IPA) to precipitate the modified HEC. The precipitate is washed with IPA and dried. The product is soluble in water with a 25-time increase in the viscosity at 1% concentration as compared with the unmodified HEC. The yield is about 9.5 g. IR analysis shows signals at 1715 and 1740 cm$^{-1}$. $^{13}$C-NMR also shows peaks at 14, 23 and 30 ppm, indicating the formation of the esterified HEC.

From the foregoing description, one skilled in the art can easily ascertain the essential characteristics of this invention, and without departing from the spirit and scope thereof, can make various changes and modifications of the invention to adapt it to various usages and conditions.

3. β-lactone Ring-opened and Alcoholized Ketene Dimer

It is also found in this invention that the β-lactone ring of ketene dimers can be opened through alcoholysis when enzyme is present as a catalyst. The composition of this β-lactone ring-opened ketene dimer can be used to make esterified polysaccharide.

The composition of the reaction according to this invention can be represented by the general structure as shown below:

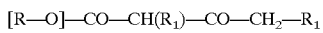

wherein R is a hydroxyl-containing compound, and $R_1$ represents a linear or a branched aliphatic or olefinic chain having 2 to 20 carbons. The composition contains about 10 to 100 wt. % of β-lactone ring-opened and alcoholized ketene dimer, such as methyl 2,4-dialkyl-acetoacetate, which is a reaction product between a hydroxyl-containing compound and a ketene dimer with the presence of an enzyme as a catalyst.

In a typical reaction, a hydroxyl-containing compound, about 1 to 75 wt. % of the reaction mixture, is mixed with an organic solvent and a ketene dimer. The organic solvents and ketene dimer are present in an amount of about 10 to 95 wt. % and 0.1 to 10 wt. % of the reaction mixture respectively. An enzyme is added to the reaction mixture just before the start of the reaction. The amount of enzyme used is about 0.01 to 10 wt. % of the reaction mixture. The enzyme opens the β-lactone ring of the ketene dimer and forms a covalent intermediate ("acyl-enzyme intermediate"), which further reacts with the hydroxyl groups of the hydroxy-containing compound.

The temperature of the reaction is optimally about 20 to 100° C., preferably about 40 to 60° C. The most preferred temperature is about 50° C. The reaction time is about 1 to 72 hours. The preferable reaction time is about 24 to 72 hours.

At the end of the reaction, enzymes may be deactivated using heat. The entire composition is washed with an organic solvent, such as hexane or other similar solvents.

Solubility of the composition in water varies according to the types of starting material used. Some compositions are water-soluble and some are not. The composition has a molecular weight of about 200 to 1,000,000.

Many different hydroxyl-containing compounds can be used in this invention. These include polyethylene glycol, ethanol, methanol, and sucrose. The preferred hydroxyl-containing compound is polyethylene glycol.

Many different ketene dimers can be used in this reaction. These include alkyl ketene dimers (AKD) such as Aquapel® from Hercules, alkenyl ketene dimer such as Precise® from Hercules, and various ketene dimer of mixed fatty acids. The preferred ketene dimers are aliphatyl or olefinyl ketene dimer with 8 to 44 carbons and 0 to 6 double bonds. More preferred ketene dimers are those in which alkyl or alkenyl groups are selected from stearyl, palmityl, oleyl, linoleyl groups and mixtures thereof. Some of the fatty acid ketene dimers are known materials, which are prepared by the 2+2 addition reaction of the alkyl ketenes. This reaction is illustrated schematically, as follows:

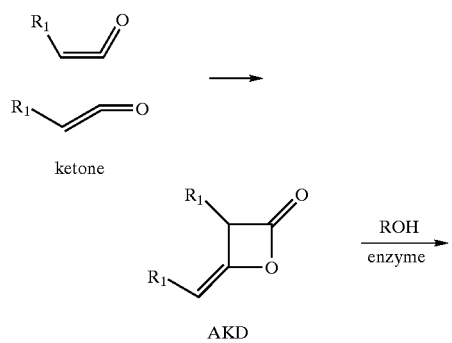

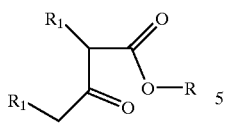

Suitable organic solvents are hydrocarbons, polar aprotic solvents, and non-polar solvents, including ketones, ethers, and cyclic ethers. The preferable solvents are polar aprotic compounds. The most preferable solvent is t-butyl methyl ether.

The process uses an enzyme, preferably lipase, under mild conditions in organic solvents. The enzyme is used here as a catalyst for the reaction between hydroxyl-containing compounds and ketene dimers. The enzyme used is a hydrolase. More preferably it is a lipase or protease. Such enzymes can be obtained from animal, plant, bacteria, virus, yeast, fungi, or mixtures thereof. Preferably the enzyme is a lipase obtained from Pseudomonas sp., or *Pseudomonas fluorescens, Candida antarctica, Candida rugosa, Candida cylindracea, Porcine pancreas, Rhizopus delemar, Rhizopus Niveus* or mixtures thereof. Most preferably, the enzyme is a lipase obtained from Pseudomonas sp. or from *Pseudomonas fluorescens*. Similar enzyme from synthetic sources may also be used.

Without further elaboration, it is believed that one skilled in the art can, using the preceding description, utilize the present invention to its fullest extent.

The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight, unless otherwise indicated.

EXAMPLE 10

AKD (Aquapel® 36H, Hercules, 0.2 g) is dissolved in 4 ml of t-butyl methyl ether containing 0.2 ml of methanol. 0.05 g of Lipase P (from *Pseudomonas fluorescens*, Amano) is added. The reaction mixture is stirred at 50° C. for 72 hours. TLC analysis shows a new spot at $R_f 0.3$ ($SiO_2$, EtOAc/Hex, 1:9, detected by $I_2$ vapor or $H_2SO_4$. $R_f$ of AKD=0.45) which is confirmed with $^1H$ and $^{13}C$ NMR analysis. This product is isolated by flush chromatography (silica, EtOAcHex=10:1). The yield is 1.6 g. It is identified to be methyl 2,4-dialkyl-acetoacetate: $^1H$-NMR ($CDCl_3$, 300 Hz) 3.73 (s, 3H, $CH_3O$—), 3.59–3.34(t, 1H, CH—COOR), 2.50–2.20 (m, 2H, —$COCH_2$—),1.76(m, 2H, $CH_2$—C—COO—), 1.1 8(m, 60H, —$CH_2$—), 0.81–0.78(t, 6H, —$CH_3$); $^{13}C(CDCl_3$, 75.5 Hz) 205.5(—CO—), 170.4 (—COOR), 51.4($CH_3O$—)].

EXAMPLE 11

AKD (Aquapel® 36H, Hercules, 0.2 g) is dissolved in 4 ml of t-butyl methyl ether containing 0.2 ml of methanol. 0.05 g of lipases is added. The reaction mixture is stirred at 50° C. for 48 hours. The progress of the reaction is monitored by TLC analysis ($SiO_2$, EtOAc/Hex, 1:9, detected by 12 vapor or $H_2SO_4$). The $R_f$ of AKD is 0.45 and the $R_f$ of methyl 2,4-dialkyl-acetoacetate is 0.3. The results are summarized in the following table.

TABLE II

Estimated Conversion of the Lipase-Catalyzed Alcoholysis of AKD

| Example | Lipases Sources | Conversion (%) 24 hrs | Conversion (%) 48 hrs | Conversion (%) 72 hrs |
| --- | --- | --- | --- | --- |
| 11.1 | Candida antarctica | 10 | 40 | 40–50 |
| 11.2 | Candida rugosa | <2 | <2 | <10 |
| 11.3 | Candida cylindracea | <2 | <2 | <10 |
| 11.4 | Pseudomonas fluorescens | 20 | 75 | 90 |
| 11.5 | Porcine pancreas | 10 | 45 | 45–50 |
| 11.6 | Rhizopus delemar | <2 | <2 | <2 |
| 11.7 | Rhizopus Niveus | <2 | <2 | <2 |
| 11.8 | None | <2 | <2 | <2 |

Lipase from *Candida antarctica* is obtained from Novo Nordisk; Lipase from *Porcine Pancreas* is purchased from Sigma. The rest are obtained from Amano.

These commercial lipases are examined for the β-lactone ring opening reaction under the same solvolytic conditions. Moderate reaction rates are observed for both lipase from *Porcine pancreas* (PPL) and immobilized lipase from *Candida antarctica* (Novozym 435). It is worth noting that the AKD ring-opening reaction with both PPL and Novozym 435 has almost completely stopped after approximately 50% of AKD has converted to methyl 2,4-dialkyl-acetoacetate. These results suggest that both enzymes catalyze alcoholysis of AKD enantioselectively.

EXAMPLE 12

A polyethylene glycol sample (Fluka, molecular weight of 8,000, 7 g) is dissolved in 20 ml of DMF. 0.7 g of alkyl ketene dimer (Aquapel® 36H, Hercules) is added, followed by 0.5 g of Lipase AK (from Pseudomonas sp. Amano). The reaction mixture is stirred at 50° C. for 72 hours. The solvent is removed and the residues are washed with hexane three times to remove unreacted AKD. After drying in air, the yield for the reaction is about 7.2 g. The product is partially water-soluble. IR analysis shows the absorption at 1710 and 1740 $cm^{-1}$, corresponding to the ketone and ester functional group, respectively.

From the foregoing description, one skilled in the art can easily ascertain the essential characteristics of this invention, and without departing from the spirit and scope thereof, can make various changes and modifications of the invention to adapt it to various usages and conditions.

4. Applications

The esterified polysaccharide made using the present invention can be used in many applications where high viscosity and hydrophobic interaction are the desired properties. Such applications comprise uses as a paint thickener, paint stabilizer, construction materials, and emulsifier in personal care products. They can also find uses as antihalation coatings, as excipient for tablets, etc. For instance, esterified polysaccharide made from the present invention is added to paint to replace ordinary paint thickener, it is expected that it can be used effectively as a paint thickener with desired properties. Also, this product is added to construction materials. It is expected that shear and tensile strength of the construction material is noticeably improved. This product is also added to solution to make personal care products such as lotion and hand cream. It is expected that high viscosity is achieved in these personal care products and such high viscosity remain substantially unchanged after months.

From the foregoing description, one skilled in the art can easily ascertain the essential characteristics of this invention, and without departing from the spirit and scope thereof, can make various changes and modifications of the invention to adapt it to various usages and conditions. For example, in examples 1–4, the products are precipitated out and washed with IPA. But other similar solvents, such as hexane, can also be used to wash the products.

What is claimed is:

1. A process for making an esterified polysaccharide comprising adding an effective amount of enzyme to a polysaccharide reaction mixture, wherein said effective amount of enzyme is about 0.01 to 10 wt. % based on the weight of the polysaccharide reaction mixture, and said reaction mixture comprises a reaction medium, a polysaccharide and a ketene dimer.

2. The process according to claim 1 wherein said enzyme is a lipase or a protease.

3. The process according to claim 2 wherein said enzyme is a lipase obtained from a source selected from a group consisting of Pseudomonas sp., *Pseudomonas fluorescens, Candida antarctica, Candida rugosa, Candida cylindracea, Porcine pancreas, Rhizopus delemar, and Rhizopus Niveus.*

4. The process according to claim 3 wherein said lipase is obtained from Pseudomonas sp. or from *Pseudomonas fluorescens.*

5. The process according to claim 1 wherein said reaction medium is an organic solvent medium.

6. The process according to claim 5 wherein said organic solvent medium is at least one selected from the group consisting of hydrocarbons, polar aprotic solvents, and non-polar solvents.

7. The process according to claim 6 wherein said organic solvent medium is a non-polar solvent selected from the group consisting of ketones, ethers, and cyclic ethers.

8. The process according to claim 5 wherein said organic solvent medium is a polar aprotic compound.

9. The process according to claim 8 wherein said polar aprotic compound is at least one selected from the group consisting of N,N-dimethylacetamide, N,N-dimethylformamide, and dimethylsulfoxide.

10. The process according to claim 5 wherein said organic solvent medium is present in an amount of about 10 to 95 wt. % based on the total weight of said reaction mixture.

11. The process according to claim 1 wherein said polysaccharide is at least one selected from the group consisting of hydroxyethylcellulose, hydroxypropylcellulose, carboxymethylcellulose, guar, cationic guar and hydroxypropylguar.

12. The process according to claim 11 wherein said polysaccharide is hydroxyethylcellulose.

13. The process according to claim 11 wherein said polysaccharide is present in an amount of about 1 to 75 wt. % based on the total weight of the reaction mixture.

14. The process according to claim 1 wherein said ketene dimer is one of alkyl ketene dimer, alkenyl ketene dimer, and ketene dimer of mixed fatty acids.

15. The process according to claim 14 wherein the alkyl or alkenyl group of said ketene dimer has 8 to 44 carbons.

16. The process according to claim 15 wherein said alkyl or alkenyl group is one selected from the group consisting of stearyl, palmityl, oleyl, linoleyl and mixtures thereof.

17. The process according to claim 14 wherein said ketene dimer is present in an amount of about 0.10 to 10 wt. % based on the total weight of the reaction mixture.

18. The process according to claim 1 wherein the reaction mixture temperature is maintained at between about 20° C. to 100° C. during reaction.

19. The process according to claim 18 wherein the reaction temperature is between about 40° C. to 60° C.

20. The process according to claim 18 wherein the reaction time is between about 1 to 72 hours.

21. The process according to claim 20 wherein the reaction time is between about 6 to 24 hours.

22. The process according to claim 20 further comprising deactivating the enzyme by the end of the reaction.

23. The process according to claim 22 further comprising washing the reaction product with isopropyl alcohol.

24. The process according to claim 23 further comprising drying the washed reaction product.

25. A process of making esterified polysaccharide comprising:

adding enzyme in the amount of about 0.013 to 13 wt. % based on the weight of polysaccharide to a reaction mixture;

said reaction mixture comprising:
   (A) cellulose ether or guar ether;
   (B) an alkyl or alkenyl ketene dimer; and
   (C) an organic solvent selected from the group consisting of N,N-dimethylacetamine, N,N-dimethylformamide, and dimethylsulfoxide;

heating the reaction mixture for about 6 to 24 hours at about 40° C. to 60° C.;

deactivating said enzyme by the end of the reaction;

washing the reaction product with isopropyl alcohol; and drying the reaction product.

* * * * *